United States Patent
Bakierska et al.

(10) Patent No.: US 11,117,802 B2
(45) Date of Patent: Sep. 14, 2021

(54) CARBOGEL ANODE MATERIALS AND METHOD FOR THEIR PREPERATION

(71) Applicant: UNIWERSYTET JAGIELLONSKI, Cracow (PL)

(72) Inventors: Monika Bakierska, Suwalki (PL); Marcin Molenda, Cracow (PL); Agnieszka Chojnacka, Brzeszcze (PL); Michal Swietoslawski, Cracow (PL)

(73) Assignee: UNIWERSYTET JAGIELLONSKI, Cracow (PL)

( * ) Notice: Subject to any disclaimer, the term of this patent is extended or adjusted under 35 U.S.C. 154(b) by 143 days.

(21) Appl. No.: 16/083,562

(22) PCT Filed: Feb. 3, 2017

(86) PCT No.: PCT/IB2017/050591
§ 371 (c)(1),
(2) Date: Sep. 10, 2018

(87) PCT Pub. No.: WO2017/153855
PCT Pub. Date: Sep. 14, 2017

(65) Prior Publication Data
US 2019/0071311 A1    Mar. 7, 2019

(30) Foreign Application Priority Data
Mar. 9, 2016   (PL) ...................................... P.416438

(51) Int. Cl.
*C01B 32/05* (2017.01)
*C01B 32/00* (2017.01)
(Continued)

(52) U.S. Cl.
CPC .............. *C01B 32/05* (2017.08); *C01B 32/00* (2017.08); *C10B 53/02* (2013.01); *H01M 4/583* (2013.01); *H01M 4/587* (2013.01); *H01M 4/625* (2013.01); *B01J 13/0091* (2013.01); *C01P 2006/40* (2013.01); *H01M 10/0525* (2013.01); *H01M 2004/023* (2013.01); *Y02E 50/10* (2013.01)

(58) Field of Classification Search
None
See application file for complete search history.

(56) References Cited

U.S. PATENT DOCUMENTS

| | | |
|---|---|---|
| 4,873,218 A | 10/1989 | Pekala |
| 8,790,548 B2 | 7/2014 | Budarin et al. |
| 2012/0034442 A1* | 2/2012 | Pauzauskie ........... C01B 32/184 428/219 |

OTHER PUBLICATIONS

Yang et al.; 3D Hierarchical Porous Graphene Aerogel with Tunable Meso-Pores on Graphene Nanosheets for High-Performance Energy Storage; Nature Scientific Reports; Sep. 18, 2015.*

(Continued)

*Primary Examiner* — Colin W. Slifka
(74) *Attorney, Agent, or Firm* — Flener IP & Business Law; Zareefa B. Flener

(57) ABSTRACT

Carbogel anode materials and method for their preparation are disclosed. The described carbogels exhibit, at a temperature of 20° C., an electrical conductance of at least 0.5 S/cm and a reversible electrochemical capacity in relation to lithium of at least 350 mAh/g under a C/2 discharge current, enabling their use for preparation of anode materials, particularly those intended for preparation of lithium-ion cells.

18 Claims, 1 Drawing Sheet

(51) Int. Cl.
| | |
|---|---|
| H01M 4/587 | (2010.01) |
| H01M 4/62 | (2006.01) |
| C10B 53/02 | (2006.01) |
| H01M 4/583 | (2010.01) |
| H01M 10/0525 | (2010.01) |
| B01J 13/00 | (2006.01) |
| H01M 4/02 | (2006.01) |

(56) References Cited

OTHER PUBLICATIONS

Journal of Materials Science (1989), Organic aerogels from the polycondensation of resorcinol with formaldehyde, R. W. Pekala, Lawrence Livermore National Laboratory.

The Journal of Supercritical Fluids, Supercritical drying of aerogels using CO2: Effect of extraction time on the end material textural properties, Received Aug. 10, 2011, Received in revised form Feb. 13, 2012, Accepted Feb. 14, 2012, C.A. García-González,, M.C. Camino-Rey, M. Alnaief, C. Zetzl, I. Smirnova.

Journal of Non-Crystalline Solid, Letter to the Editor, Resorcinol-formaldehyde aerogels prepared by supercritical acetone drying, Changhai Liang, Guangyan Sha, Shucai Guo, Received Jul. 26, 1999; received in revised form Sep. 21, 1999.

Polymer, Starch-derived carbon aerogels with high-performance for sorption of cationic dyes, Xinhong Chang, Dairong Chen, Xiuling Jiao, Key Laboratory of Special Functional Aggregated Materials, Received Nov. 23, 2009, Received in revised form Feb. 27, 2010, Accepted Jun. 5, 2010, Available online Jun. 12, 2010.

Dyes and Pigments, Preparation of carbon aerogels with different pore structures and their fixed bed adsorption properties for dye removal, Xinbo Wu, Dingcai Wu, Ruowen Fu, Wei Zeng, Materials Science Institute, Article history: Received May 3, 2012, Received in revised form Jun. 28, 2012, Accepted Jul. 2, 2012, Available online Jul. 9, 2012.

Carbon aerogels, cryogels and xerogels: Influence of the drying method on the textural properties of porous carbon materials, Nathalie Job, Alexandre Thery, Rene Pirard, Jose Marien, Laurent Kocon, Jean-Noe ̈l Rouzaud, Francois Beguin, Jean-Paul Pirard, Laboratoire de Genie Chimique, Received Jan. 26, 2005; accepted Apr. 30, 2005, Available online Jun. 23, 2005.

Electrochimica Acta, Carbon aerogels as electrode material for electrical double layer supercapacitors—Synthesis and properties, Agnieszka Halama, Bronislaw Szubzda, Grzegorz Pasciak Electrotechnical Institute, Article history: Received Sep. 15, 2009, Received in revised form Mar. 10, 2010, Accepted Mar. 13, 2010, Available online Mar. 20, 2010.

Review paper, Carbon aerogels for catalysis applications: An overview, C. Moreno-Castilla, F.J. Maldonado-Hodar, Departamento de Quimica Inorganica, Received Sep. 15, 2004; accepted Oct. 15, 2004, Available online Nov. 25, 2004.

Short communication, Cresol-formaldehyde based carbon aerogel as electrode material for electrochemical capacitor Yudong Zhu, Haoquan Hu,, Wen-Cui Li, Xiaoyong Zhang, State Key Laboratory of Fine Chemicals, Received Mar. 2, 2006; received in revised form Jun. 17, 2006; accepted Jun. 20, 2006, Available online Jul. 28, 2006.

Aerožele Organiczne I Węglowe, Organic and Carbon Aerogels, Krzysztof Brodzik, Marek Stolarski, Jerzy Walendziewski, Instytut Chemii i Technologii Nafty i Węgla, WIADOMOŚCI 2004, 58, 7-8, PL IS S N 0043-5104.

Electrochimica Acta, Preparation and electrochemical properties of pitch-based activated carbon aerogels, Xianhua Zeng, Dingcai Wu, Ruowen Fu, Huajie Lai, Junjia Fu, Materials Science Institute, Article history: Received Dec. 2, 2007, Received in revised form Mar. 11, 2008, Accepted Mar. 18, 2008, Available online Mar. 22, 2008.

Carbohydrate Polymers, Review, Polysaccharide-based aerogels—Promising biodegradable carriers for drug delivery systems, C.A. García-González, M. Alnaief, I. Smirnova, Institute of Thermal Separation Processes, Article history: Received May 2, 2011, Received in revised form Jun. 21, 2011, Accepted Jun. 23, 2011, Available online Jul. 1, 2011.

Carbohydrate Polymers, Preparation of tailor-made starch-based aerogel microspheres by the emulsion-gelation method, C.A. García-González, J.J. Uy, M. Alnaief, I. Smirnova, Institute of Thermal Separation Processes, Article history: Received Nov. 24, 2011, Received in revised form Jan. 31, 2012, Accepted Feb. 13, 2012, Available online Feb. 22, 2012.

RSC Advances, PAPER, Carbon aerogels from bacterial nanocellulose as anodes for lithium ion batteries, Liping Wang, Christina Schutz, German Salazar-Alvarez, and Maria-Magdalena Titirici, Received Dec. 21, 2013, Accepted Mar. 26, 2014.

11th International Symposium on Systems with Fast Ionic Transport, ISSFIT 11, Functional starch based carbon aerogels for energy applications, M. Bakierska, M. Molenda, D. Majda, R. Dziembaj, Jagiellonian University, 2014.

Tutorial Review, Chemical Socieiy Reviews, Tuneable porous carbonaceous materials from renewable resources, Robin J. White, Vitaly Budarin, Rafael Luque, James H. Clark, and Duncan J. Macquarrie, Received May 11, 2009.

\* cited by examiner

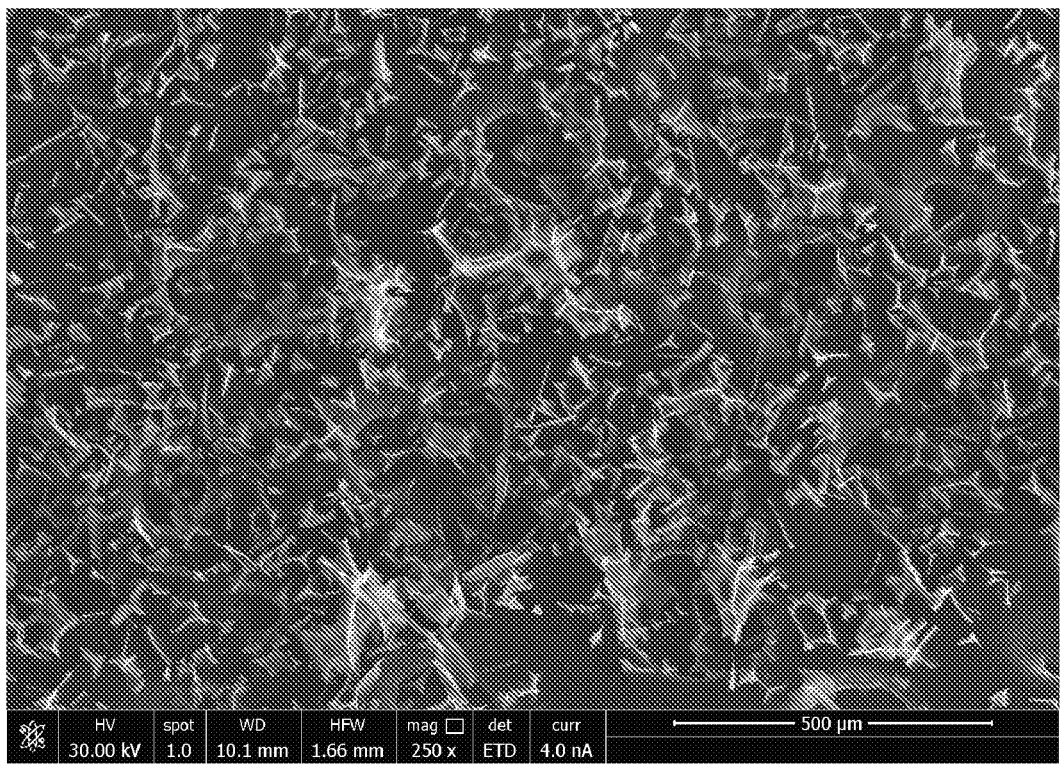

CARBOGEL ANODE MATERIALS AND METHOD FOR THEIR PREPERATION

The invention relates to carbogel anode materials with controlled structure, morphology and electrochemical properties, and a method for preparation of such materials.

Carbon aerogels have been known for approximately 25 years, and for the first time, they have been obtained by American scientist Richard W. Pekala et al. in Lawrence Livermore National Laboratory [1]. Most often, carbon aerogels are synthesised in the result of polycondensation of resorcin and formaldehyde, which, forming a cured thermosetting polymer, may be subjected to carbonification in an inert gas atmosphere, which leads to a carbon material. Addition of formaldehyde to resorcin occurs in the presence of hydroxide ions, with formation of 2,4-dimethoxy-1,3-dihydroxybenzene. The molecules being formed undergo to gradual polymerisation, leading to formation of resorcin-formaldehyde (RF) oligomers. In the result of condensation and growth of these RF oligomers, a sol forms, which subsequently transforms itself to a gel, forming a three-dimensional polymer network [2]. In order to preserve their porous structure, the obtained organic gels are dried (after previous solvent exchange) under supercritical conditions, most often using $CO_2$ [3,4]. Also, classical methods for gel drying at an elevated temperature and under atmospheric pressure are known in the literature [5,6].

Currently, the main source of carbon aerogels are resorcin-formaldehyde aerogels [6-9]. However, a portion of resorcin used for RF aerogel synthesis may be replaced with cresols [10]. Possible precursors of organic aerogels may include also: melamine, isocyanate, poly(vinyl chloride), phenol, and furfural, as well as 2,3-didecyloxoanthracene [11]. Preparation of aerogels from natural polymers is also known [12-18].

Particular properties of carbon aerogels: textural, thermal, electrical, and other properties unlock a series of possible uses for them [11]. Products which may be obtained based on carbogels include: catalyst carriers, adsorbents, thermal insulations, reinforcing agents for organic plastics or synthetic rubber, pigments for inks, energy storage units, electrode and electronic materials, gas separators, carriers for antiadhesives, and membranes.

The goal of the invention is to obtain carbogels with improved electrical properties, particularly desired in the case of anode materials, especially those intended for manufacturing of lithium-ion cells. Obtaining carbogels with a high electrical conductance (preferably at least 0.5 S/cm) and very good electrochemical properties (preferably exhibiting a capacity in relation to lithium of at least 350 mAh/g under a C/2 discharge current) is particularly desirable.

Furthermore, it is desirable to provide a method for preparation of such improved carbogels, which would allow for eliminating the time-consuming drying step and generation of a disposal-requiring waste, such method thus being better suited for industrial application.

Surprisingly, the problem defined above has been solved in the present invention.

The invention relates to a method for preparation of a carbogel, particularly a carbogel intended for preparation of carbogel anode materials, the method comprising a direct pyrolysis of organic alcogels and characterised in that an aqueous suspension containing 1-30% by wt. of a starch composition consisting of rice starch (RS) in the amount of 75-100% by wt. and another starch type (XS) in the amount of 0-25% by wt. is subjected to polycondensation at a temperature of 50-90° C., then a solvent exchange is carried out using solutions of an alcohol (A) or a ketone (K) with a concentration increasing from 10% to 99.8%, and then the obtained organic alcogel is subjected to a pyrolysis process at a temperature of 300° C. to 2000° C.

Preferably, the solvent exchange is carried out in several steps, using an aqueous solution of ethanol, methanol, isopropanol or acetone, and gradually increasing the solution concentration from 10% to 99.8%.

Preferably, the pyrolysis is carried out under inert conditions, preferably in an inert gas atmosphere, most preferably argon, nitrogen or helium.

Preferably, the pyrolysis is carried out under slightly reducing conditions.

Preferably, the pyrolysis is carried out in vacuo.

In the method according to the invention, the carbogels are obtained via a direct pyrolysis of organic alcogels prepared from starch of natural origin (rice, corn, potato, wheat, tapioca, sago starches, and mixtures thereof). The organic alcogels are obtained in the result of polycondensation of a suspension of a corresponding starch composition in water and solvent exchange while maintaining the spatial structure of the system.

Surprisingly, it turned out that use of a proper starch composition, consisting of rice starch in the amount of 75-100% by wt. and other starch type: corn, potato, wheat, tapioca or sago starch, in a total amount of 0-25% by wt., allowed for obtaining chemically stable carbogels with a special hierarchical structure, texture and morphology, and a high electrical conductance (≥0.5 S/cm for materials pyrolysed at a temperature of at least 600° C.), and very good electrochemical properties (capacity in relation to lithium of at least 350 mAh/g under a C/2 discharge current for materials pyrolysed at a temperature of 700° C.).

In the method according to the invention, the corresponding starch composition is mixed with water in the amount of 1-30% by wt. to prepare a suspension being subjected to polycondensation at an elevated temperature of 50-90° C. The so-obtained hydrogel is aged at room temperature, and then, the solvent exchange is carried out to generate a proper hierarchical spatial structure ensuring the desired morphological properties of the carbogel being obtained. The so-prepared starch alcogel is directly subjected to a controlled pyrolysis process at a temperature of 300-2000° C. depending on the desired parameters of the carbogel.

The method according to the invention allows for eliminating the costly and time-consuming gel drying process, usually carried out under supercritical conditions at a high temperature, which enables to obtain directly the carbogel from a starch alcogel in a single step process.

The polycondensation process is carried out in aqueous medium, and the solutions of alcohols or acetone are being regenerated, making the technology environmentally safe and friendly.

Another subject of the invention is a carbogel exhibiting, at a temperature of 20° C., an electrical conductance of at least 0.5 S/cm and a reversible electrochemical capacity in relation to lithium of at least 350 mAh/g under a C/2 discharge current.

Preferably, the carbogel according to the invention may be obtained by the above-defined method according to the invention.

Another subject of the invention is use of the above-defined carbogel according to the invention, for preparation of anode materials, particularly those intended for preparation of lithium-ion cells.

The carbogels according to the invention stand out from among other currently known carbon materials because of their low roughness, vitreousness and lack of mesopores, translating into higher density three-dimensional (volumetric) packing, inducing in turn an increase in volumetric and gravimetric capacities of the anode material. Minimum carbon content C in the carbogel structure is 92% by wt. A defined and repeatable microporosity, characteristic for these carbogel materials, facilitates formation of a SEI (solid electrolyte interface) layer, and as a consequence, it decreases the activation energy of the process of lithium ions intercalation into the system. Moreover, the anode materials prepared according to the method exhibit an ordered hierarchical lamellar structure, translating into good mechanical properties. FIG. 1 shows the microstructure of the carbogel according to the invention, obtained by the method according to the invention.

The disclosed composition of the alcogel precursor and the described process for preparation of the carbogel allow for obtaining a carbogel with properties desirable in case of anode materials for lithium-ion cells. Furthermore, the method according to the invention enables functionalisation of the obtained materials depending on the requirements of their application (possibility to affect the development of the material surface, degree of graphitisation, its electrical conductance and electrochemical parameters). The method according to the invention allows for eliminating the costly and time-consuming drying process, particularly that carried out under supercritical conditions.

The method according to the invention may find an application in obtaining anode materials for lithium-ion batteries. In conventional lithium-ion cells, carbon materials (a capacity in relation to lithium of 200-350 mAh/g) based on non-renewable resources (fossil coals), are used as anode materials. On the other hand, carbogel anode materials according to the invention are characterised by improved parameters of operation in the cell (a higher capacity, a better performance under higher current loads, an increased chemical stability towards the electrolyte), and their application in commercial Li-ion batteries does not require changes in the cell manufacturing technology, which makes implementation of the invention significantly easier and less costly. Also, the carbogels according to the invention may be used as conductive additives for electrode materials in lithium-ion batteries and other systems for energy storage and processing, as well as catalyst carriers or catalysts.

The invention is presented in more detail in the embodiments described below.

EXAMPLE 1

To obtain 5 g of a carbogel from potato starch, 25 g of potato starch (Sigma Aldrich) were weighed. Then, 250 g of a potato starch suspension was prepared in proportion of 10% by wt. of starch—90% by wt. of distilled water, and the suspension was placed in a water bath and heated to 75° C. After 30 min from the polycondensation of starch, the obtained product was removed from the water bath and aged for 24 h. Then, the sample was poured over with 96% ethanol (POCh) solution and left for another 24 h tightly sealed. After 6 days, the solvent exchange was repeated. After next 6 days since the last exchange of the alcohol solution, the obtained alcogel was subjected to pyrolysis at a temperature of 700° C. under argon atmosphere (99.999%) for 6 hours.

The obtained carbogel was characterised by an electrical conductance of 0.83 S/cm at a temperature of 25° C. and an electrical conductance activation energy of $E_a$=0.007 eV. Electrochemical tests showed that obtained material is characterised by a gravimetric capacity—after 40 cycles under a current load of C/2, it amounted to 136 mAh/g.

EXAMPLE 2

To obtain 5 g of a carbogel from rice starch, 25 g of rice starch (Sigma Aldrich) were weighed. Then, 250 g of a rice starch suspension was prepared in proportion of 10% by wt. of starch—90% by wt. of distilled water, and the suspension was placed in a water bath and heated to 75° C. After 30 min from the polycondensation of starch, the obtained product was removed from the water bath and aged for 24 h. Then, the sample was poured over with 96% ethanol (POCh) solution and left for another 24 h tightly sealed. After 6 days, the solvent exchange was repeated. After next 6 days since the last exchange of the alcohol solution, the obtained alcogel was subjected to pyrolysis at a temperature of 700° C. under argon atmosphere (99.999%) for 6 hours.

The obtained carbogel was characterised by an electrical conductance of 0.46 S/cm at a temperature of 25° C. and an electrical conductance activation energy of $E_a$=0.017 eV. Electrochemical tests showed that the obtained material is characterised by a high gravimetric capacity—after 40 cycles under a current load of C/2, it amounted to 315 mAh/g.

EXAMPLE 3

To obtain 5 g of a carbogel from corn starch, 25 g of corn starch (Sigma Aldrich) were weighed. Then, 167 g of a corn starch suspension was prepared in proportion of 15% by wt. of starch—85% by wt. of distilled water, and the suspension was placed in a water bath and heated to 75° C. After 30 min from the polycondensation of starch, the obtained product was removed from the water bath and aged for 24 h. Then, the sample was poured over with 96% ethanol (POCh) solution and left for another 24 h tightly sealed. After 6 days, the solvent exchange was repeated. After next 6 days since the last exchange of the alcohol solution, the obtained alcogel was subjected to pyrolysis at a temperature of 700° C. under argon atmosphere (99.999%) for 6 hours.

The obtained carbogel was characterised by an electrical conductance of 0.75 S/cm at a temperature of 25° C. and an electrical conductance activation energy of $E_a$=0.037 eV. Electrochemical tests showed that the obtained material is characterised by a gravimetric capacity—after 40 cycles under a current load, it amounted to 171 mAh/g.

EXAMPLE 4

To obtain 5 g of carbogel from rice and corn starch, 22.5 g of rice starch and 2.5 g of corn starch (Sigma Aldrich) were weighed and mixed together. Then, 250 g of a mixed starch suspension was prepared in proportion of 10% by wt. of the starch mixture—90% by wt. of distilled water, and the suspension was placed in a water bath and heated to 75° C. After 30 min from the polycondensation of starch, the obtained product was removed from the water bath and aged for 24 h. Then, the sample was poured over with 96% ethanol (POCh) solution and left for another 24 h tightly sealed. After 6 days, the solvent exchange was repeated. After next 6 days since the last exchange of the alcohol solution, the obtained alcogel was subjected to pyrolysis at a temperature of 700° C. under argon atmosphere (99.999%) for 6 hours.

The obtained carbogel was characterised by an electrical conductance of 0.51 S/cm at a temperature of 25° C. and an electrical conductance activation energy of $E_a=0.015$ eV. Electrochemical tests showed that the obtained material is characterised by a high gravimetric capacity—after 40 cycles under a current load of C/2, it amounted to 353 mAh/g.

REFERENCES

[1] R. W. Pekala, U.S. Pat. No. 4,873,218, 1989
[2] R. W. Pekala, *Journal of Materials Science* 24 (1989) 3221-3227
[3] C. A. Garcia-González, M. C. Camino-Rey, M. Alnaief, C. Zetzl, I. Smirnova, *Journal of Supercritical Fluids* 66 (2012) 297-306
[4] C. Liang, G. Sha, S. Guo, *Journal of Non-Crystalline Solids* 271 (2000) 167-170
[5] X. Chang, D. Chen, X. Jiao, *Polymer* 51 (2010) 3801-3807
[6] X. Wu, D. Wu, R. Fu, W. Zeng, *Dyes and Pigments* 95 (2012) 689-694
[7] N. Job, A. Théry, R. Pirard, J Marien, L. Kocon, J. N. Rouzaud, F. Beéguin, J. P. Pirard, *Carbon* 43 (2005) 2481-2494
[8] A. Halama, B. Szubzda, G. Pasciak, *Electrochimica Acta* 55 (2010) 7501-7505
[9] C. Moreno-Castilla, F. J. Maldonado Hódar, *Carbon* 43 (2005) 455-465
[10] Y. Zhu, H. Hu, W. C. Li, X. Zhang, *Journal of Power Sources* 162 (2006) 738-742
[11] K. Brodzik, M. Stolarski, J. Walendziewski, *Wiadomości Chemiczne* 58, 7-8 (2004) 637-660
[12] X. Zeng, D. Wu, R. Fu, H. Lai, J. Fu, *Electrochimica Acta* 53 (2008) 5711-5715
[13] C. A. Garcia-González, M. Alnaief, I. Smirnova, *Carbohydrate Polymers* 86 (2011) 1425-1438
[14] C. A. Garcia-González, J. J. Uy, M. Alnaief, I. Smirnova, *Carbohydrate Polymers* 88 (2012) 1378-1386
[15] L. Wang, C. Schutz, G. Salazar-Alvarez, M.-M. Titirici, *RSC Advances,* 4 (2013) 17549-17554
[16] M. Bakierska, M. Molenda, D. Majda, R. Dziembaj, *Procedia Engineering,* 98 (2014) 14-19
[17] V. Budarin et al., Patent WO 2007/104798 A2, 2007
[18] R. J. White, V. Budarin, R. Luque, J. H. Clark, D. J. Macquarrie, *Chemical Society Reviews,* 38 (2009) 3401-3418

The invention claimed is:

1. A carbogel comprising at least 92% by wt. of carbon and exhibiting, at a temperature of 20° C., an electrical conductance of at least 0.5 S/cm and a reversible electrochemical capacity in relation to lithium of at least 350 mAh/g under a C/2 discharge current;
wherein the carbogel is prepared by a method comprising the steps of:
subjecting an aqueous suspension comprising 1-30% by wt. of a first starch composition consisting of rice starch in the amount of 75-99% by wt. and a second starch type in the amount of 1-25% by wt. to polycondensation at a temperature of 50-90° C.;
carrying out a solvent exchange using an aqueous solutions of an alcohol or a ketone with a concentration increasing from 10% to 99.8% to obtain an organic alcogel, and
subjecting the obtained organic alcogel to a pyrolysis process at a temperature of 300-2000° C. immediately following the solvent exchange step.

2. The carbogel according to claim 1, wherein it exhibits a low roughness, vitreousness, lack of mesopores, and an ordered hierarchical lamellar structure.

3. A method for preparation of the carbogel according to claim 1, wherein the method comprises the steps of:
subjecting an aqueous suspension comprising 1-30% by wt. of a starch composition consisting of rice starch in the amount of 75-99% by wt. and another starch type in the amount of 1-25% by wt. to polycondensation at a temperature of 50-90° C.;
carrying out a solvent exchange using an aqueous solutions of an alcohol or a ketone with a concentration increasing from 10% to 99.8%; and
subjecting the obtained organic alcogel to a pyrolysis process at a temperature of 300-2000° C. immediately following the solvent exchange step.

4. The carbogel according to claim 1, wherein it has a structure obtained by the method defined in claim 3.

5. The method according to claim 3, wherein as the second starch type, starch selected from the group comprising: corn starch, potato starch, wheat starch, tapioca starch, and sago starch, is used.

6. The carbogel according to claim 1, wherein it has a structure obtained by the method defined in claim 5.

7. The method according to claim 3, wherein as the alcohol, one selected from the group comprising: ethanol, methanol, and isopropanol, is used.

8. The carbogel according to claim 1, wherein it has a structure obtained by the method defined in claim 7.

9. The method according to claim 3, wherein acetone is used as the ketone.

10. The carbogel according to claim 1, wherein it has a structure obtained by the method defined in claim 9.

11. The method according to claim 3, wherein the pyrolysis is carried out under inert conditions.

12. The carbogel according to claim 1, wherein it has a structure obtained by the method defined in claim 11.

13. The method according to claim 11, wherein the pyrolysis is carried out in an inert gas atmosphere, preferably selected from a group including: argon, nitrogen, and helium.

14. The carbogel according to claim 1, wherein it has a structure obtained by the method defined in claim 13.

15. The method according to claim 3, wherein the pyrolysis is carried out under slightly reducing conditions.

16. The method according to claim 3, wherein the pyrolysis is carried out in vacuo.

17. An anode material made from a carbogel for use in a lithium-ion cell, the carbogel comprising:
at least 92% by wt. of carbon; and
exhibiting, at a temperature of 20° C., an electrical conductance of at least 0.5 S/cm and a reversible electrochemical capacity in relation to lithium of at least 350 mAh/g under a C/2 discharge current; and wherein
the carbogel is prepared by a method comprising the steps of:
subjecting an aqueous suspension comprising 1-30% by wt. of a first starch composition consisting of rice starch in the amount of 75-99% by wt. and a second starch type in the amount of 1-25% by wt. to polycondensation at a temperature of 50-90° C.;
carrying out a solvent exchange using an aqueous solutions of an alcohol or a ketone with a concentration increasing from 10% to 99.8% to obtain an organic alcogel, and subjecting the obtained organic alcogel to a pyrolysis process at a temperature of 300-2000° C. immediately following the solvent exchange step.

18. The anode material of claim 17, wherein the carbogel exhibits a low roughness, vitreousness, lack of mesopores, and an ordered hierarchical lamellar structure.

\* \* \* \* \*